Figure 4:
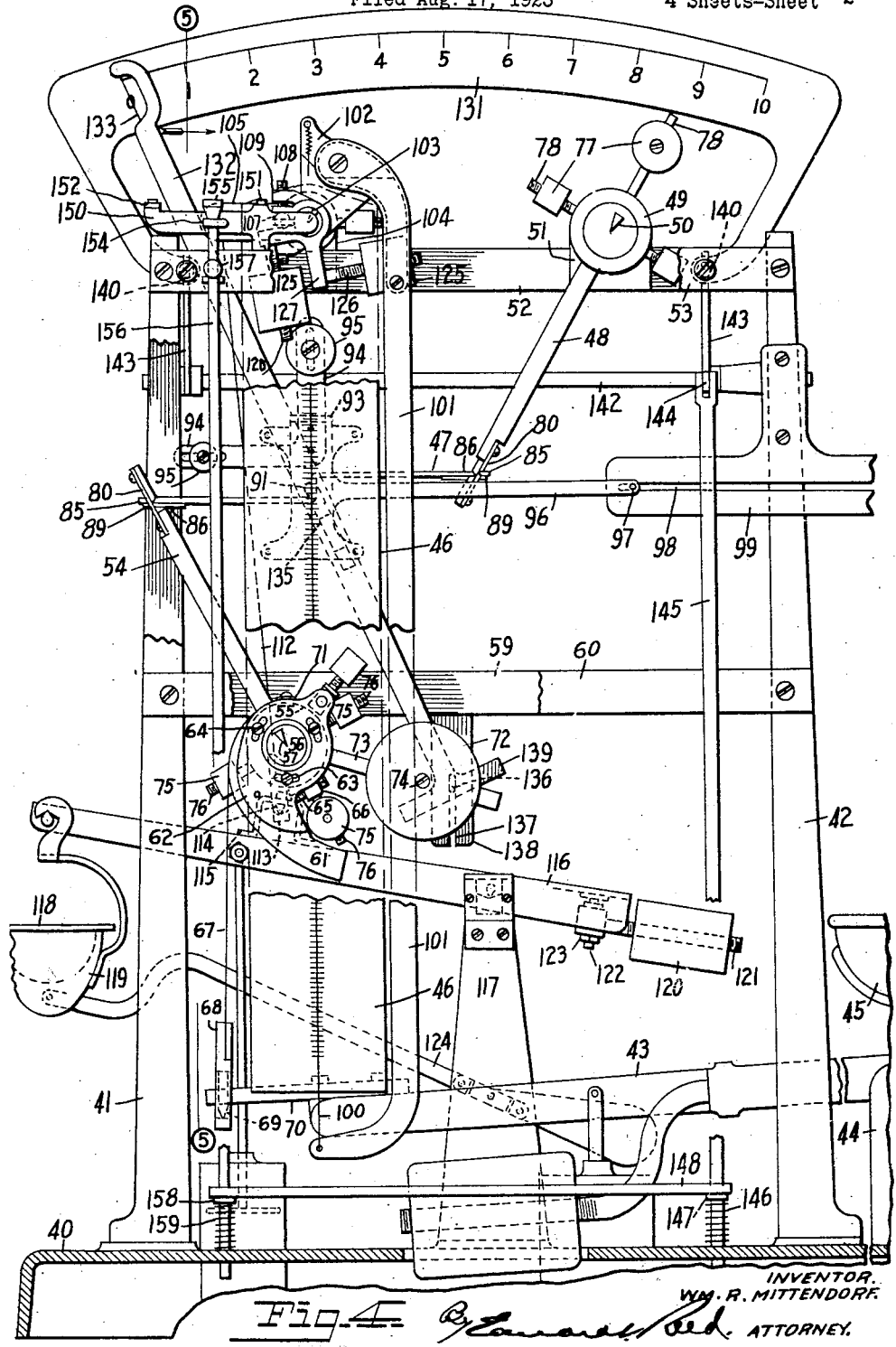

June 12, 1928.
W. R. MITTENDORF
1,672,951
COMPUTING SCALE
Filed Aug. 17, 1923
4 Sheets-Sheet 1
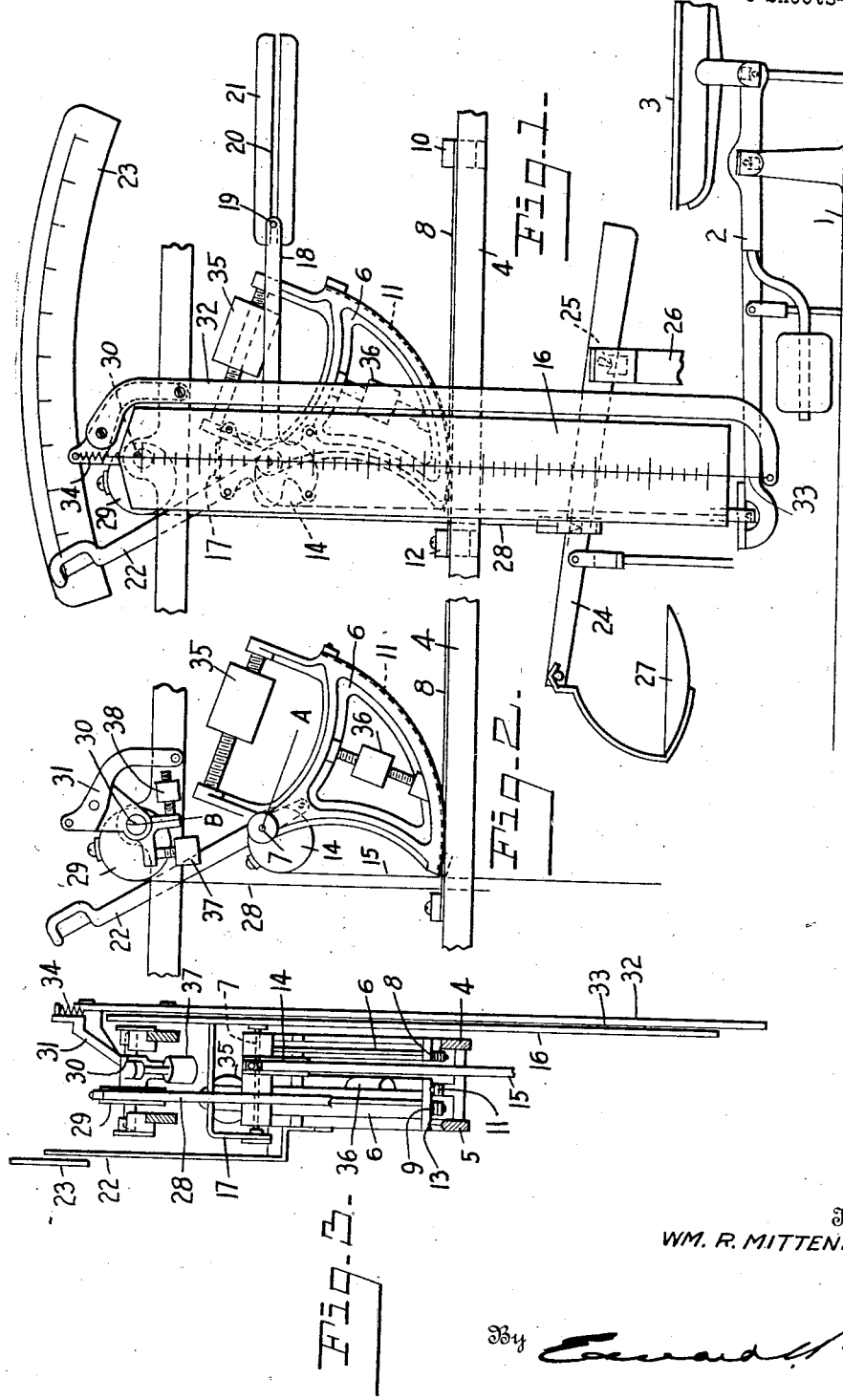
Inventor
WM. R. MITTENDORF.
By Edward Reed
Attorney June 12, 1928.  W. R. MITTENDORF  1,672,951

COMPUTING SCALE

Filed Aug. 17, 1923  4 Sheets-Sheet 2

INVENTOR.
WM. R. MITTENDORF.
ATTORNEY.

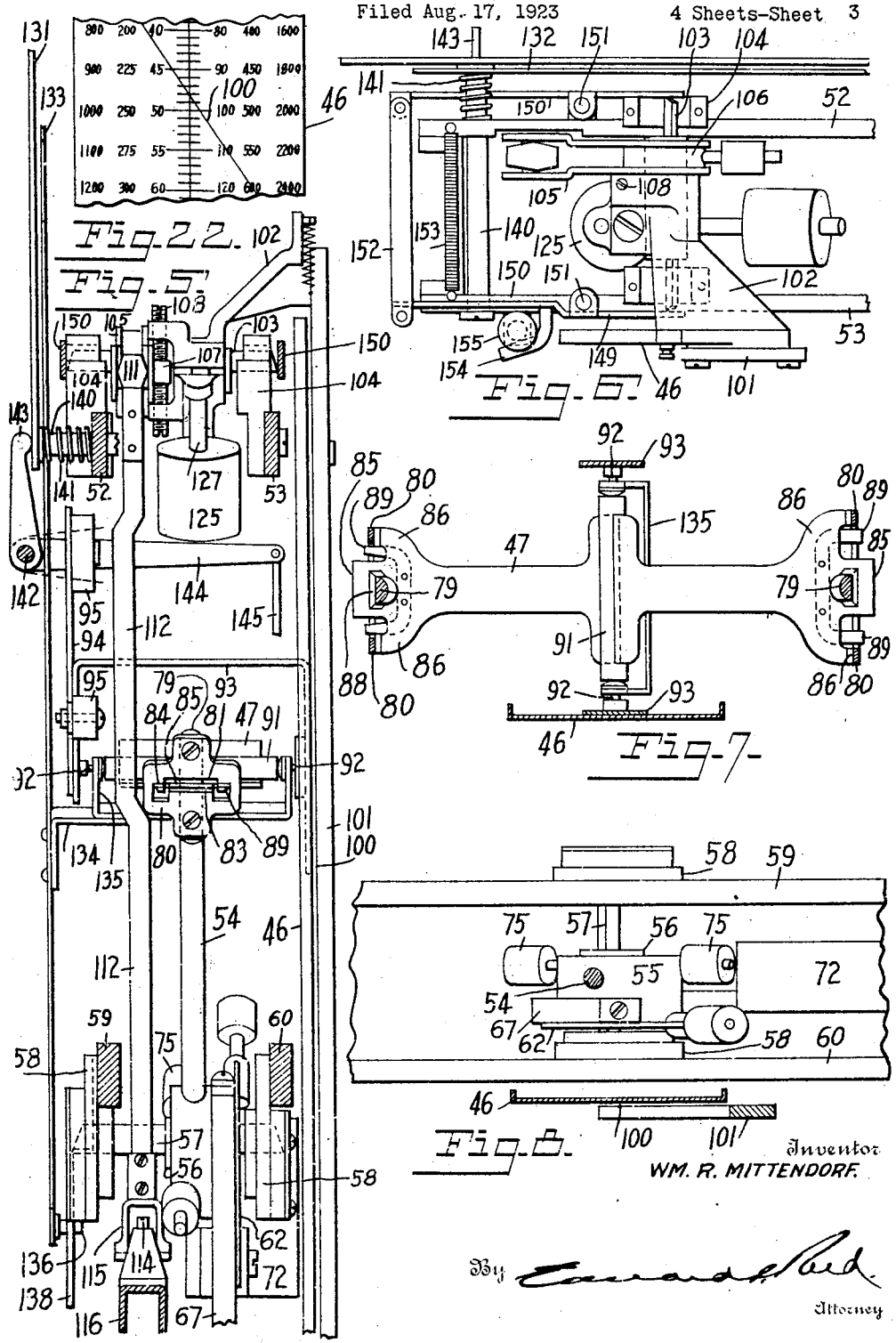

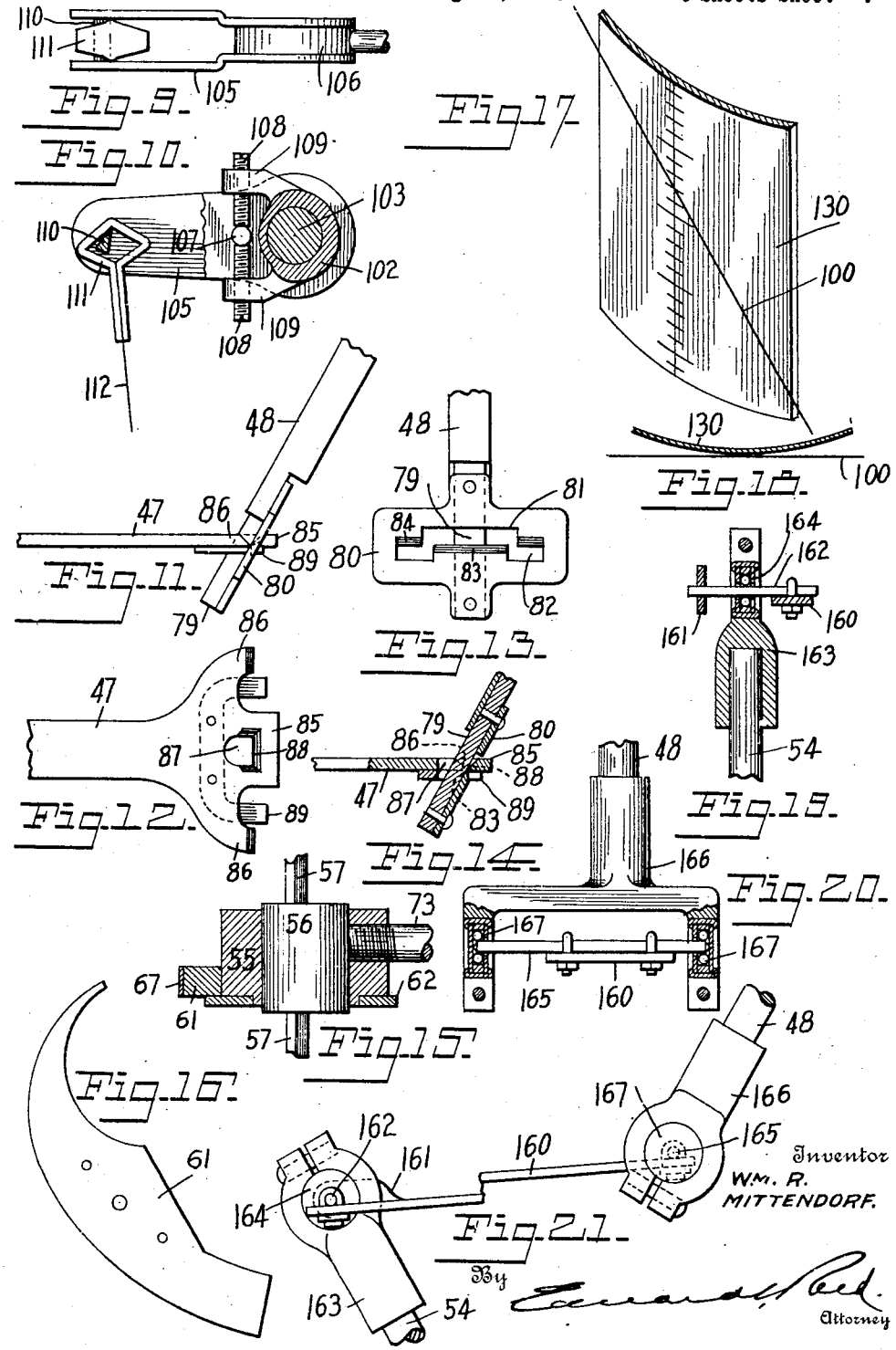

Patented June 12, 1928.

1,672,951

UNITED STATES PATENT OFFICE.

WILLIAM R. MITTENDORF, OF CINCINNATI, OHIO, ASSIGNOR, BY MESNE ASSIGNMENTS, TO THE WATSON EXPERIMENTAL LABORATORY COMPANY, OF DAYTON, OHIO, A CORPORATION OF OHIO.

COMPUTING SCALE.

Application filed August 17, 1923. Serial No. 657,912.

This invention relates to computing scales and the present application is a continuation of the application filed by me September 23, 1922, Serial No. 590,085, in so far as the novel subject matter is common to the two applications.

One object of the invention is to provide an automatic scale in which the computations will be accurately effected.

A further object of the invention is to provide such a scale with a balance operated indicating member, or computing chart which will have substantially a straight line movement, the divisions of which will be of equal length for equal increments of weight on the balance.

A further object of the invention is to provide such a computing chart which will be supported solely by pivots and the straight line movement of which will be secured from the pivotal action of the supporting member.

A further object of the invention is to provide a scale of the type shown in the above mentioned application in which the movement of the computing chart will be controlled by the load balance.

A further object of the invention is to provide an indicating device in which the indicating members may be so positioned that an absolutely accurate reading may be taken therefrom regardless of the position of the reader with relation to the indicating members.

Other objects of the invention will appear as the mechanism is described in detail.

In the accompanying drawings Fig. 1 is a front elevation, partly broken away, of a scale embodying one form of my invention; Fig. 2 is a detail view of the supporting and actuating devices for the indicating members; Fig. 3 is a side elevation of the mechanism shown in Fig. 2; Fig. 4 is a front elevation of a scale, partly broken away, showing another embodiment of the invention; Fig. 5 is a sectional view taken on the line 5—5 of Fig. 4; Fig. 6 is a plan view of the supporting and actuating device for the indicating wire; Fig. 7 is a plan view of the link which carries the computing chart; Fig. 8 is a plan view of the hub unit carrying the link; Fig. 9 is a plan view of the actuating arm for the indicating wire; Fig. 10 is a section, partly in elevation, of the hub unit and actuating arm for the indicating wire; Fig. 11 is a side elevation of the connection between the link and one of its supporting arms; Fig. 12 is a plan view of one end of the link; Fig. 13 is an elevation of the pivot end of one of the supporting arms for the link; Fig. 14 is a sectional view taken through the knife edged pivot connection for the link and one of the arms; Fig. 15 is a sectional view of the load actuated hub unit; Fig. 16 is a detail view of the load controlled cam for controlling the position of the computing chart; Fig. 17 is a front elevation of portions of the cooperating indicating members; Fig. 18 is a transverse sectional view of the indicating members; Fig. 19 is a sectional detail view of a modified form of connection between the link and one of the supporting arms; Fig. 20 is a detail view, partly in section, of a modified form of connection between the link and the other supporting arm; Fig. 21 is a side elevation of a modified form of link support showing the link partly broken away; Fig. 22 is a detail view of a portion of the computing chart.

This invention contemplates the use of the two cooperating indicating members one of which is in the form of on elongated chart having a series of graduations extending lengthwise thereof and the other of which is in the form of a long thin indicating member, such as a wire, which is mounted independently of the chart. These indicating members are preferably so arranged that they will normally occupy positions substantially parallel one with the other, the indicating wire extending lengthwise of the chart in front thereof and registering with the center line of the chart. One of the indicating members, in the present instance the chart, is mounted for transverse movement toward and from its normal position and this movement is imparted thereto by operatively connecting the same with the load balance. The other indicating member, in the present instance the wire, is movable into a position in which it will intersect the first indicating member so that the wire will indicate a certain graduation on the chart which represents the result of the computation which has been made. The last mentioned indicating member, or wire, is preferably pivotally mounted and swinging movement may be imparted thereto in any suitable manner, as by connecting it to or combining it with a unit balance when the scale is to be used as a counting scale or with other suitable actuating device when the scale is to be used for other computations. The load balance and the unit balance are entirely separate one from the other and there is no connection whatever between the indicating members. With this arrangement of indicating members I am enabled to utilize a single series of graduations and to compute a result based on various units of computation, such as units of different weight in counting. This results from the fact that the significance of the graduations on the chart change with each change of unit of computation, as is clearly set forth in the above mentioned application.

In that embodiment of the invention shown in Figs. 1, 2 and 3, the scale comprises a main frame consisting of a base 1 on which is pivotally mounted a load balance lever 2, here shown as a lever of the first principle but which may be of any suitable type. On the outer end of this lever is supported the load receptacle or platform 3 which may be of any suitable character and the inner end of the lever is connected with the mechanism for actuating the computing chart. As here shown the main frame comprises two parallel horizontal bars 4 and 5 upon which is mounted a segment 6, the bars constituting a track over which the curved base of the segment rolls. This segment may, if desired, be formed in two parts separated one from the other but rigidly connected through their axes by a common supporting member, such as a shaft 7. The segment has connected with one end thereof, the left hand end in Figs. 1 and 2, straps or ribbons 8 and 9 which are connected at their opposite ends with a cross tie between the bars or tracks 4 and 5, as shown at 10. A third ribbon or strap 11 is connected at one end with the right hand end of the segment and at its other end with a cross bar or tie 12 extending between the bars 4 and 5. The straps or ribbons are drawn taut to hold the segment firmly in contact with the supporting bars or track as it rocks to and fro thereon. The upper surface of the bar 4 is flat as is the corresponding part of the segment 6 which engages that bar. The upper edge of the bar 5, however, is preferably beveled on its opposite sides and the adjacent portion of the segment 6 is provided with a V-shaped groove 13 to receive the beveled edge of the bar and thus hold the segment against crosswise displacement with relation to the bars. Rigidly mounted on the shaft 7 is a cam 14 which is connected by a ribbon 15 with the nose end of the main lever 2 of the load balance. The chart which is shown at 16 is connected with the segment for movement therewith as the latter rocks on the bars or tracks 4 and 5 but is so mounted that it will be retained in an upright or vertical position in all positions of the segment. In the present instance the shaft 7, which is arranged at the axis of the segment, projects beyond the ends of the hub thereof and forms trunnion bearings for a yoke 17 to which the chart 16 is rigidly secured. In this manner the chart is pivotally supported from the axis of the segment but the greater portion of its weight is below that axis so that it will tend normally to hang in a vertical position. However, to prevent the chart from having an oscillating movement about its axis I have provided the yoke 17 with an arm 18 at the outer end of which is a pin 19 which travels in a guideway or slot 20 formed between two stationary bars 21 which are rigidly secured to the casing or the frame of the machine. Preferably the pin 19 is so arranged in the slot that when the chart is at rest in a true vertical position the pin will not touch either wall of the slot but float between the bars 21. In order that the device may indicate the weight of the load as well as the computation I have mounted on the segment 6 a weight indicating arm or pointer 22 which travels over a weight chart 23 as the segment rocks on the tracks 4 and 5. When the scale is used for a counting scale a unit balance is provided for actuating the second indicating member or wire and, as here shown, this unit balance mechanism comprises a main lever 24 mounted at 25 in bearings formed in a bracket 26 carried by the main frame and having pivotally connected therewith, at its outer end, a unit pan 27. The lever 24 is here shown as a lever of the second principle, but it may be of any suitable type. A strap 28 is connected at its lower end with the lever 24 and at its upper end with a cam 29, rigidly and adjustably mounted on a shaft or pivot bar 30 journaled in suitable bearings on the main frame. Rigidly secured to the shaft or pivot bar 30 is a member or arm 31 on which is mounted a downwardly extending bar or arm 32, the two arms constituting a supporting member which carries the second indicating member or wire 33. It so supports the wire that when the parts are in their normal positions the wire will register with the center line of the chart 16, as shown in Fig. 1. If desired, a spring 34 may be interposed between the wire and its point of connection with the supporting member 32 to hold the wire taut. In the construction here illustrated the segment 6, and its associated parts, exclusive of the cam 14, is not counterbalanced around its axis and it will therefore in itself serve as a counterbalance for the load balance, in lieu of the usual pendulum. In other words, it is desired to have the segment 6 and the parts attached to it serve as the pendulum counterbalance, in which case the segment becomes in effect the pendulum. To this end it is necessary to establish the center of gravity of the segment and the parts attached to it in the proper relation to the axis of the segment, in order to get the right counterbalancing effect. This center of gravity must be established substantially along the line A of Fig. 2, as the counterbalancing action is that of a descending pendulum. It will be noted that practically all of the mass of the segment is on the lower left hand side of the line. Therefore, it becomes necessary to locate an offsetting mass on the upper right hand side of said line in order to position the center of gravity approximately on said line. This offsetting mass consists mainly of a weight 35 with the rod and arms which support the same. However, in order that the center of gravity may be definitely located on the line A I provide a second weight, 36, which is adjustable toward and from said line. Not only must the center of gravity be established on the center of line A but it must be located at the proper distance from the axis of the segment. For that purpose the weight 35 is made adjustable parallel with said line. Thus it will be seen that the adjustment of the weight 36 acts to distribute the weight of the whole mass equally on each side of the line A and that the adjustment of the weight 35 acts to locate the center of gravity of the whole mass at the proper distance from the axis without effecting the distribution of the mass on each side of said line. It will be apparent, however, that the mechanism may, if desired, be so arranged as to provide a counterbalancing action equivalent to that of the rising pendulum which is opposed to the weight of the load on the platform. The arm 31 of the unit balance mechanism is provided with weights 37 and 38 the purpose of which is substantially the same as that of the weights 35 and 36, namely to cause the arm and the parts attached to it to become in effect a pendulum to counterbalance the load in the unit pan 27, through the lever 24. As the counterbalancing action of the arm 31 and the parts attached to it is that of a rising pendulum, the center of gravity of said counterbalance should be established substantially along the line B of Fig. 2. Obviously, however, the mechanism may, if desired, be so arranged as to provide a counterbalancing action equivalent to the action of a reverse pendulum, which descends as the load is applied to the lever.

In the operation of a device of this character it will be apparent that the load on the load platform causes the movement of the main lever 2 of the load balance and its counterbalancing segment 6, resulting in a transverse movement of the chart 16, this movement being in direct proportion to the load on the platform. Inasmuch as the point of connection of the chart with the segment is on the axis of the segment it will be apparent that the chart will travel in substantially a straight line parallel with the bars 4 and 5. When the unit of computation is placed in the pan 27 the lever 24 will be actuated and the wire supporting member 32, together with the indicating wire 33, will be moved about the axis of the pivot bar 30 a distance proportionate to the weight of the unit. The indicating members being thus brought into intersecting relation the number of parts on the load platform will be indicated by that graduation on the chart which is intersected by the indicating wire.

The mechanism above described will enable the computing chart to be moved in a substantially straight line and the divisions in said movement will be equal in length for equal increments of weight on the platform of the load balance, thus effecting the accurate computation. However, this type of mechanism may not be desirable for extreme accuracy under certain conditions of use and I have therefore provided another form of mechanism which will accomplish the same result wholly from the pivotal action of supporting members, thereby eliminating the use of tracks or other contact surfaces. Such a mechanism is shown in Figs. 4 to 16.

As shown in Fig. 4, the main frame of the scale comprises a base 40 having upright standards 41 and 42 and the various parts of the mechanism are mounted on this frame. The main lever 43 of the load balance is pivotally mounted on standards 44 carried by the base 40 and the outer end of this lever carries the load receptacle or platform 45. This lever is here shown as a lever of the first principle but obviously it may be of any suitable character. The inner end of the lever is operatively connected with the mechanism for actuating the computing chart, or indicating member. In order to secure substantially a straight line movement, and an equal dividing of said movement, I have mounted the computing chart upon a supporting member which, in the present instance, is in the nature of a link pivotally connected at its respective ends with pivoted members the ends of which move through equal arcs extending in opposite directions. The ends of the supporting member for the chart being pivotally connected with the ends of the pivoted members it will be apparent that one end of the supporting member will move through a convex arc and the other end of the supporting member will move through a concave arc, the two arcs being substantially equal in all respects. As the result when one end of the supporting member is moved upwardly to the right the other end thereof is moved downwardly to the right and the two movements are compensatory in character and as a result an intermediate point on the supporting member will travel in a substantially straight line and at this point I have pivotally mounted the chart on the supporting member. The point of support for the chart may not move in an absolutely straight line but its deviations from a straight line are so slight that they will have no appreciable effect upon the computation. In this manner the chart is carried by an oscillating structure having a part moving in a substantially straight line and supporting the chart, so that the chart itself will move in a substantially straight line. In the present device the oscillating structure comprises pivoted members and a link but obviously it may take various forms and may consist of any suitable number of parts.

In the construction here illustrated the chart 46 is mounted upon a supporting member or link 47 which, as shown in Fig. 7, is in the form of a plate or bar of sheet metal. This link is pivotally supported at one end by an arm 48 which depends from a hub 49 having a pivot pin 50 the ends of which are shaped to form knife edged pivots and are seated in suitable V bearings in plates 51 secured to cross bars 52 and 53 on the upper portion of the main frame. This hub is preferably provided with balancing devices whereby the center of gravity of the hub and its connected parts may be adjusted with relation to its axis, it being preferable that the center of gravity should be at the axis, thereby eliminating resistance to the movement of the arm. Preferably this balancing device comprises weights 77 adjustably mounted on rods 78 secured to the hub. The other end of the link 37 is pivotally connected with an arm 54 in the form of a rod rigidly secured to and extending upwardly from a hub 55 which is provided with a pivot pin 56 having its end portions shaped to form knife edge pivots 57 which rests in V bearings formed in plates 58 depending from cross bars 59 and 60 forming part of the main frame. Connected with the hub 55 is a cam 61. This cam is preferably adjustable with relation to the hub and I have, in the present instance, rigidly secured the same to a plate 62 which is connected with but is adjustable relatively to the hub. The plate is here shown as provided with a plurality of arcuate slots 63 through which extend screws 64 which enter the end of the hub and secure the plate thereto. These screws, however, do not clamp the plate to the hub but leave it free to have a limited movement relatively to the hub about the axis thereof.

The position of the plate, and consequently of the cam, with relation to the hub, is controlled by a suitable stop which is here shown as a screw 65 threaded into a lug 66 carried by the hub and arranged to engage the edge of the cam, or plate, so as to limit the movement of these parts with relation to the hub. The cam is connected by means of a ribbon 67 with the main lever 43 of the load balance, the ribbon having at its lower end a stirrup 68 having a bearing to receive a needle point 69 carried by the nose piece 70 of the lever. The upper end of the ribbon is not secured directly to the cam but has its upper end secured to the hub, this being preferably accomplished by means of screws and a clamping plate 71. The ribbon therefore merely bears upon the cam and is not directly connected therewith, thereby causing the ribbon to maintain a fixed relation to the hub when the cam is shifted with relation thereto. The tension on the ribbon 67 will hold the cam in contact with the stop screw 65 and will thus retain the hub and the cam in their predetermined relative positions. The hub is provided with a counterbalance, here shown as a weight 72 adjustably mounted on an arm 73 and held in its adjusted position thereon by means of a screw 74. This weight is adjusted to counterbalance the weight of the main lever 43 with its associated parts, and its counterbalancing action is that of a reverse pendulum but it will be understood that, if desired, the arrangement of the mechanism may be such that the counterbalancing action will be that of a rising pendulum. The hub 55 and its associated parts, exclusive of the weight 72 are also provided with balancing means for adjusting the center of gravity thereof, so that this center of gravity can be established at the axis of the hub. As here shown this balancing means comprises a series of weights 75 adjustably mounted on rods 76 carried by the hub.

The pivoted connection between the link 47 and the arms 48 and 54 is preferably a knife edged connection so as to make it as near frictionless as possible. To this end the free end of each arm, 48 and 54, is flattened on its outer side, as shown at 79, and has secured thereto a plate 80 in which is formed a transverse slot having an intermediate portion 81 and end portions 82 arranged out of line with the intermediate portion thereof. That portion of the plate lying on the outer side of the intermediate portion 81 of the slot is beveled, as shown at 83, to form an inwardly extending knife edge. Those portions of the plate opposite the portions 82 of the slot are beveled, as shown at 84, to provide outwardly extending knife edges, the arrangement being such that the knife edges of the parts 83 and 84 are in line one with the other. The end of the link 47 is widened and is shaped to provide an intermediate portion 85 and end portions 86. The intermediate portion 85 has an opening 87 to receive the flattened end portion 79 of the rod or arm and the wall of the opening 87, adjacent to the flat side of the rod, is beveled to form a knife edge 88. When the bearing is assembled the intermediate portion 85 of the link 10 will extend through the portion 81 of the slot in the plate 80 and will be retained therein by the end of the rod which extends through the opening 87, the plate 80 being secured to the rod after the latter has been inserted through the opening 87. When thus assembled the end portions or arms 86 of the link end, which are beveled to form knife edges, will bear against the end portions of the plate 80 at the respective ends of the slots. Rigidly secured to the link end on that side thereof adjacent to the end of the rod or arm are lugs or fingers 89 which extend through the portions 82 of the slot in the plate 80 and engage the knife edges 84 to hold the link against movement lengthwise of the rod 48. It will be apparent that when the bearing is assembled the several parts will be firmly held in their assembled positions and will have no appreciable movement relative one to the other, except the pivoted movement, and further that the several knife edges converge to a common longitudinal center which forms the axis of the bearing. It will be understood, of course, that the pivotal connection between the arm 54 and the supporting link 47 is similar in character to that described in connection with the arm 48.

While I prefer to utilize knife edge pivoted connections between the supporting link and the arms which carry the same it may be desirable to use bearings of other kinds and this can be done with success. In Figs. 19, 20 and 21, I have illustrated a ball bearing connection between the arms and the link. As here shown the link 160 is similar in construction to the link 47 but has one end bifurcated and one arm of the bifurcation is turned on edge to provide a supporting ear 161 which receives one end of a rod 162 the other end of which is rigidly secured, preferably by clamping, to the other arm of the bifurcation, as shown in Fig. 21. The end of the arm which is to be connected with this bifurcated end of the link, in the present instance, the arm 54, has mounted thereon a bearing member 163 within which is arranged a ball bearing 164 through which the shaft 162 extends. The other end of the link 160 has rigidly secured thereto a shaft 165 the ends of which extend beyond the lateral edges of the link and the rod 48 has secured thereto a bearing member 166 the free end of which is bifurcated and the arms of the bifurcation are provided with ball bearings 167 to receive the ends of the shaft 165.

The arms 48 and 54 which support the respective ends of the link being of equal length and extending in opposite directions it will be apparent that the ends of these arms, that is their points of pivoted connection with the link, will move in arcs of circles and that these arcs will be opposed one to the other, the arc described by the arm 48 being a downwardly curved or concave arc and the arc described by the arm 54 being an upwardly curved or convex arc. These arcs being exactly equal in all respects it will be obvious that when one end of the link is moving downwardly the other end thereof will move upwardly to exactly the same extent during the swinging movement of the link. The movements of the link being equal in opposite directions the center point on the link will travel in a substantially straight line and it is at this point of the link that the chart 46 is pivotally mounted.

The chart may be mounted on the link in any suitable manner but I prefer to mount on the link a transverse shaft 91 the ends of which are reduced to form pintals 92 extending beyond the respective sides of the link. The chart 46 is rigidly secured, preferably at a point above the longitudinal center thereof, to one arm of a yoke shaped member 93 the arms of which embraces the link and are provided with bearings by means of which they are supported on the pintals 92 of the shaft 91. The chart being connected with the link above the center thereof it will be apparent that it would normally hang in a vertical position but I have provided balancing devices whereby the center of gravity may be established at the axis about which the chart moves. To this end I have secured to one arm of the yoke 93 arms 94 on which are adjustably mounted weights 95, the adjustments of the weights serving to adjust the center of gravity. It will be apparent that as the supporting link 47 moves from one position to the other its position with relation to the chart 46 will constantly change and I have provided means for retaining the chart in its vertical position throughout the movement of the link. This means is substantially the same as that above described in connection with the first form of the device and consists of an arm 96 rigidly secured to the yoke which carries the chart and having at its outer end a pin 97 extending into a slot 98 formed in a member 99 rigidly secured to the upright standard 42 of the main frame. The pin is of a diameter slightly less than the width of the slot 98 and is so arranged that when the chart is in a true vertical position it will be out of contact with both walls of the slot and will consequently move freely and without friction within the slot, touching the walls of the slot only when the chart tends to move from a vertical position, and as the chart is balanced about its axis no appreciable pressure will be exerted by the pin upon the wall of the slot during these brief contacts.

The second indicator, which cooperates with the chart, is of substantially the same form as that above described and consists of a wire 100 extending lengthwise of the chart and connected at its ends to a supporting member 101 which supporting member consists of a bar rigidly secured at its upper end to a member or arm 102. The arm 102 is mounted on a pivot pin 103 which extends through an opening in the arm and is rigidly secured thereto. The ends of the pivot pin are provided with knife edges to engage V bearings in plates 104 secured to the bars 52 and 53, respectively. Operatively connected with the member 102 is an arm 105 which, in the present instance, consists of two parallel bars rigidly secured to a hub 106 which is loosely mounted upon the pivot pin 103. The arm 105 is connected with the member or arm 102 of the second indicator, which supports the indicator wire, by means of a stud or projection 107 extending between two screws 108 adjustably mounted in arms 109 carried by the member 102. By adjusting the screws 108 the relative positions of the arm 105 and the member 102 may be adjusted. The arm 105 carries in its outer end a knife edged pivot 110 which engages V bearings in a stirrup 111 with which is connected a ribbon 112 which extends downwardly and is provided at its lower end with a stirrup 113 having a bearing to engage a needle point 114 carried by a bracket 115 secured to the main lever 116 of the unit balance. This lever also may be of any suitable character but is here shown as of the first principle. This unit lever is pivotally mounted between its ends on a bracket 117 carried by the base 40, and has at one end thereof a unit receptacle 118 which, in the present instance, is supported on a carrier 119 pivotally mounted on the lever. The initial load of the lever 116, that is the tension required on the ribbon 112 at the zero position of the indicator, is regulated by means of a weight 120 mounted on a screw 121 which is attached to the lever by means of a screw stud 122 and lock nuts 123 by means of which the weight may be adjusted upward or downward to obtain the proper degree of sensitiveness in the lever. To prevent the unit receptacle and its carrier 119 from swinging back and forth on its pivot a check link 124 is provided, one end of which is pivoted to the carrier 119 and the other end of which is pivoted to one of the standards 117. The distance between the points of connection of the check link with the carrier and with the standard or bracket is the same as the distance between the pivot of the lever and the axis of the carrier. The member 102 of the wire support is also provided with balancing means whereby the center of gravity of that member and its associated parts may be established in proper relation to the knife edge of the pivot and in proper relation to its axis and the plumb line extending from said axis. As here shown, this balancing means is in the form of weights 125 adjustably mounted on rods 126 secured to lugs 127 projecting from said member 102. The action of the counterbalance thus provided for the weight of the unit is that of a rising pendulum but, if desired, the mechanism may be so arranged that the counter balancing action will be that of a reverse pendulum.

The operation of this form of the device is substantially the same as that of the form first described. It will be apparent that when a unit is placed in the unit receptacle 118 the indicator wire will be moved into an inclined position and when a mass of such units has been placed upon the load platform 45 the computing chart 46 will be moved in a straight line from left to right, on Fig. 1, a distance corresponding to the weight of the mass and when the chart comes to rest that graduation thereon which is intersected by the wire will represent the number of articles in the mass.

This scale is also provided with means for indicating the weight of the mass of articles on the load platform this indication being made simultaneously with the indication of the computation. To this end I have mounted on the upper portion of the frame a weight chart 131 graduated in units of weight up to 10 pounds, which is the capacity of the present scale. Cooperating with this stationary chart is an indicator arm 132 carrying an indicator wire 133 which travels over the chart. The indicator arm is mounted on the supporting link 47 and is preferably secured to a bracket 134 carried by a yoke shaped structure 135 the arms of which have bearings to receive the pintles 92 of the shaft 91. The lower end of the indicator arm extends below the link and is provided with a pin 136 which travels in a vertical slot 137 formed in a bracket 138 depending from the bar 59 in the main frame. This pin 136 holds the lower end of the arm against lateral movement and as the supporting link moves from one position to the other the indicating wire 133 is caused to travel over the chart 131. The indicator arm is counterbalanced to establish the center of gravity at the axis of its support on the link but, in the present instance, it is not provided with adjustable weights but has laterally extending lugs or pads 139 which are filed or otherwise cut away to establish the center of gravity.

It is important in a scale of this kind that the indication on the computing chart should be read with exact accuracy. It is desirable, however, that there should be sufficient space between the two indicating members to prevent them from contacting during their relative movements. As the result, if the reader's line of vision is not exactly in line with the indicating wire and the intersected graduation the reading is liable to be more or less inaccurate. Various methods of overcoming this difficulty have been proposed but none has been entirely satisfactory. In order to secure an absolutely accurate reading I have arranged the chart and indicator wire in spaced relation, as shown in Figs. 17 and 18, and have provided means whereby one of these members may be moved into contact with, or in very close relation to, the other member when the reading is being taken, and in that form of the device shown in Figs. 4, 5 and 6, I have so mounted one member of each of the two indicators that it can be moved toward the other member of that indicator. In the case of the weight indicator I prefer to shift the stationary indicator member or chart as this can be done without in any way affecting the movement of the movable indicating member. To this end I have mounted the chart 131 on two rods or elongated studs 140 which extend through and are slidably mounted in the bars 52 and 53 of the main frame. Springs 141 coiled about the studs, between the bar 52 and the heads at the rear ends of the respective studs, retain the same normally in their rearmost positions and the chart is thus supported in spaced relation to the indicator wire 133. To move the chart forwardly when a reading is to be taken I apply pressure to the rear ends of the studs so as to force the same forward against the action of the springs 141. In the present construction I have mounted a shaft 142 in the main frame and have rigidly secured thereto two upwardly extending arms 143 the upper ends of which bear against the rear ends of the studs 140 and when rocking movement is imparted to the shaft 142 move these studs and the chart forwardly. Rigidly secured to the shaft 142, and preferably formed integral with one of the arms 143, is a forwardly extending arm 144 with which is pivotally connected an actuating rod 145 which extends downwardly through a guideway in the base 40. A spring 146 coiled about the lower end of the rod 145 acts on a collar 147 to hold the rod normally in its uppermost position. The rod 145 is provided with a suitable actuating device preferably in the form of a finger piece which may be depressed to actuate the chart. In the present instance this finger piece consists of a bar 148 one end of which rests upon the collar 147 mounted on this rod.

In the case of the computing indicators it is necessary to shift a movable indicator because in this case both indicators move in effecting the computation. I prefer, however, to shift the indicator wire as the operating and controlling mechanism of this indicator are less complicated then are those for the chart. As has been explained the support 101 for the indicator wire 100 comprises in part the member 102 which is mounted on a knife edge pivot engaging bearings on the frame members 52 and 53. This pivot carries the whole of the supporting and controlling mechanism for the indicator wire and by shifting the pivot axially the indicator wire can be moved toward or from the chart. I have therefore made the pivot pin of such a length that one end or the other thereof may project beyond its bearing. I have beveled the ends of the knife edge pivot upwardly so as to provide a contact point which is coincident with the axis of the pivot. It will be understood that in order to shift a pivoted indicating member without in any way affecting the position of the indicator the pressure must be applied on the axis about which it moves and by providing the points on the ends of the knife edge pivot I am enabled to apply pressure on the axis of that pivot and shift the same axially without disturbing the indicating member. The shifting mechanism consists of two arms 149 and 150 pivotally mounted intermediate their ends, as shown at 151, on the members 52 and 53, respectively. One end of each of these arms engages the adjacent end of the pivot pin 103. The two arms are tied one to the other by a link 152 by means of which they are caused to move in unison. A spring 153 is connected at one end to the arm 149 and at the other end to a bar 52, thereby moving the outer end of the shifting mechanism rearwardly and causing the pivot pin to be shifted forwardly and thus holding the indicator wire away from the chart. Any suitable means may be provided for moving the shifting mechanism against the action of the spring 153 and thus moving the pivot pin rearwardly and causing the indicator wire to engage the chart but, in the present mechanism, I have provided the outer portion of the arm 149 with an angular pin 154 which, in effect, forms the socket to receive a tapered head 155 of an actuating rod 156 which is mounted at its upper end in a guide 157 and at its lower end in a guideway formed in the base 40. It will be apparent that the downward movement of the actuating rod will cause the tapered head to engage the pin 154 and move the shifting device in a direction to force the pivot pin rearwardly. Any suitable means may be provided for actuating the rod but, as here shown, it is provided with a finger piece consisting of the opposite end of the bar 148 by means of which the actuating rod 145 is operated. The end of this bar embraces the rod 156 and rests upon a collar 158 secured to the rod. A spring 159 acts on the collar 158 to hold the rod normally in its uppermost position. It will be apparent therefore that after the scale is operated to effect a computation either one or both of the indating devices may be actuated to cause the respective indicating members to be brought into contact or into such close relation one to the other that an accurate reading may be taken by the operator from any position which he may occupy without the necessity that his line of vision should be directly in line with the effetive parts of the two indicators. If desired the chart may be curved about a longitudinal axis, as shown at 130 in Figs. 17 and 18, thus giving the outer or reading face of the chart a convex surface which will provide a very narrow contact area.

While I have shown and described one embodiment of my invention I wish it to be understood that I do not desire to be limited to the details thereof as various modifications may appear to a person skilled in the art.

Having now fully described my invention what I claim as new and desire to secure by Letters Patent, is:

1. In a scale, an indicator comprising a bodily movable member, a weight actuated device having a part movable in a direction transverse to the line of movement of said movable member, and a device controlled by said part of said weight actuated member to cause said movable member to move bodily in a substantially straight line.

2. In a scale, an indicator comprising a bodily movable chart, a weight actuated device having a part movable in a direction transverse to the line of movement of said movable chart, and a device controlled by said part of said weight actuated member to cause said movable chart to move bodily in a substantially straight line.

3. In a scale, an indicator comprising a bodily movable member, a traveling support for said movable member, a weight actuated device having a part movable in a direction transverse to the line of movement of said traveling support, and a device controlled by said part of said weight actuated member for actuating said movable support and causing said indicating member to move in a substantially straight line.

4. In a scale, a weight actuated member, an indicator comprising a movable member, a traveling support on which said movable member is pivotally mounted, means controlled by said weight actuated member for actuating said support and said movable indicating member, and means for maintaining said indicating member in a predetermined position with relation to the vertical during its movement with said traveling support.

5. In a scale, a weight actuated member, an indicator comprising a movable member, a traveling support on which said movable member is pivotally mounted, the axis of said member being so arranged that said member will normally occupy a vertical position, means controlled by said weight actuated member for actuating said support to move said indicating member in a horizontal direction, and means independent of said weight actuated member to hold said indicating member against swinging movement during the movement of said support.

6. In a scale, a weight actuated member, an oscillating structure having a part movable in a substantially straight line, means controlled by said weight actuated member for imparting oscillatory movement to said structure, and an indicator comprising a member mounted on said part of said oscillating structure for bodily movement therewith.

7. In a scale, a weight actuated member, an oscillating structure having a part movable in a substantially straight line, means controlled by said weight actuated member for actuating said oscillating structure, a chart pivotally mounted on said part of said oscillating structure and having its axis so arranged that it will normally occupy a substantially vertical position, and means for retaining said member in said vertical postion during the oscillating movement of said structure.

8. In a scale, a weight actuated member, an oscillating structure having a part movable in a substantially straight line, means controlled by said weight actuated member for actuating said oscillating structure, an indicator comprising a chart pivotally mounted on said part of said oscillating structure and having its axis so arranged that it will normally occupy a substantially vertical position, a fixed member having a guideway extending parallel with the line of movement of said chart, and a part connected with said chart and adapted to travel in said guideway when movement is imparted to said chart.

9. In a scale, a weight actuated member, an oscillating structure having a part movable in a substantially straight line, means controlled by said weight actuated member for actuating said oscillating structure, an indicator comprising a chart pivotally mounted on said part of said oscillating structure and having its axis so arranged that it will normally occupy a substantially vertical position, a fixed member having a guideway extending parallel with the line of movement of said chart, an arm rigidly secured to said chart, and a part carried by said arm and extending into said guideway.

10. In a scale, a weight actuated member, an oscillating structure having a part movable in a substantially straight line, means controlled by said weight actuated member for actuating said oscillating structure, an indicator comprising a chart pivotally mounted on said part of said oscillating structure and having its axis so arranged that it will normally occupy a substantially vertical position, a fixed member having a guideway extending parallel with the line of movement of said chart, an arm rigidly secured to said chart, and a part carried by said arm and extending into said guideway, said part being of a diameter less than the width of said guideway and being so arranged with relation to said chart that when said chart is in a vertical position said part will be out of engagement with both walls of said guideway.

11. In a scale, a weight actuated member, an indicator comprising a movable member, a movable support on which said indicating member is pivotally mounted, said support being so mounted that its position relative to said indicating member will change during the movement thereof, means controlled by said weight actuated member for actuating said support, and means independent of said weight actuated member to retain said indicating member in a predetermined position with relation to the line of its movement.

12. In a scale, a weight actuated member, and indicator comprising an elongated chart, a movable support having a part movable in a substantially straight line on which part said chart is pivotally mounted, means controlled by said weight actuated member for actuating said support, the movement of said support being such that its position with relation to said chart will change during its movement, and means for retaining said chart in a predetermined position with relation to the line of movement of said part of said support.

13. In a scale, a weight actuated member, an indicator comprising an elongated chart, a movable support having a part movable in a substantially straight line on which part said chart is pivotally mounted, means controlled by said weight actuated member for actuating said support, the movement of said support being such that its position with relation to said chart will change during its movement, a fixed guideway extending parallel with the line of movement of said part of said support, and an arm connected with said chart and having a part arranged to travel in said guideway.

14. In a scale, a weight actuated member, an indicator comprising a movable member, an upwardly extending arm pivotally mounted on a fixed axis, a downwardly extending arm mounted on a fixed axis, a support for said movable indicating member pivotally connected at its ends with the respective arms, and means for operatively connecting said weight actuated member to one of said arms to control the movement of said indicating member.

15. In a scale, a weight actuated member, an indicator comprising a movable chart, an upwardly extending arm pivotally mounted on a fixed axis, a downwardly extending arm pivotally mounted on a fixed axis arranged above the axis of the first mentioned arm, a support for said chart pivotally connected at its ends with the respective arms, means for pivotally supporting said chart substantially midway between the points of connection of said support with said arms, and means for operatively connecting said weight actuated member with one of said arms to control the movement of said chart.

16. In a scale, a weight actuated member, an indicator comprising a movable chart, a pair of upright arms spaced apart and pivotally supported respectively at their upper and lower ends, a link connecting the free ends of said arm, means for pivotally supporting said chart on said link, and means controlled by said weight actuated member for actuating one of said arms to impart movement to said chart.

17. In a scale, a weight actuated member, a pair of upright arms spaced apart and pivotally mounted respectively at their upper and lower ends, a link having its ends pivotally connected with the respective arms, a transverse shaft mounted on said link and between the ends thereof, an indicating chart pivotally mounted on said shaft, means controlled by said weight actuated member for actuating one of said arms to impart movement to said chart, and an indicating member cooperating with said chart.

18. In a scale, a weight actuated member, a pair of upright arms spaced one from the other and pivotally mounted respectively at their upper and lower ends, a link extending between the free ends of said arms, knife edged pivots connecting said link with the respective arms, a chart pivotally mounted on said link between the ends thereof, means controlled by said weight actuated member for actuating one of said arms to impart movement to said chart, and an indicating member cooperating with said chart.

19. In a scale, a weight actuated member, an upwardly extending arm pivotally mounted on a fixed axis, a downwardly extending arm pivotally mounted on a fixed axis, a link extending between the free ends of said arm, interlocking parts carried by each of said arms and the adjacent end of said link, each of said parts having knife edged pivots to engage surfaces of the other part, the several knife edged pivots converging to a common center, a chart pivotally mounted on said link between the ends thereof, means controlled by said weight actuated member for actuating one of said arms to impart movement to said chart, and an indicating member cooperating with said chart.

20. In a scale, a weight actuated member, pivoted members mounted on fixed axes and having their free ends spaced apart and arranged to travel respectively in arcs one of which is reversed with relation to the other, a link pivotally connected with said ends of said members, an indicating chart pivotally mounted on said link substantially midway between its points of connection with said members, and an operative connection between one of said pivoted members and said weight actuated member.

21. In a scale, a weight actuated member, pivoted members mounted on fixed axes and having their free ends spaced apart and arranged to travel respectively in arcs one of which is reversed with relation to the other, a link pivotally connected with said ends of said members, an indicating chart pivotally mounted on said link substantially midway between its points of connection with said members, an operative connection between one of said pivoted members and said weight actuated member, and balancing devices connected with the respective members to establish the centers of gravity thereof with relation to their axes.

22. In a scale, a weight actuated member, pivoted members each comprising a hub secured to a knife edged pivot, an arm projecting from said hub, weights adjustably secured to said hub to establish the center of gravity thereof with relation to its axis, the arm of one of said pivoted members extending downwardly and the arm of the other pivoted member extending upwardly, a link pivotally connected at its ends with the free ends of the respective arms, a chart pivotally mounted on said link, and a connection between one of said hubs and said weight actuated member to control the movement of said chart.

23. In a scale, a weight actuated member, pivoted members mounted on fixed axes and each comprising a hub having an arm projecting therefrom, one of said arms extending upwardly and the other extending downwardly, a link pivotally connected at its ends to the free ends of the respective arms, a chart pivotally mounted on said link, a connection between one of said hubs and said weight actuated member, and a weight secured to the last mentioned hub to act in combination with said weight actuated member.

24. In a scale, a weight actuated member, pivoted members mounted on fixed axes and each comprising a hub having an arm projecting therefrom, one of said arms extending upwardly and the other extending downwardly, a link pivotally connected at its ends to the free ends of the respective arms, a chart pivotally mounted on said link, a cam mounted on one of said hubs, and a ribbon extending about the surface of said cam and connected with said weight actuated member.

25. In a scale, a weight actuated member, pivoted members mounted on fixed axes and each comprising a hub having an arm projecting therefrom, one of said arms extending upwardly and the other extending downwardly, a link pivotally connected at its ends to the free ends of the respective arms, a chart pivotally mounted on said link, a cam adjustably mounted on one of said hubs, a ribbon secured to said hub, extending about the peripheral surface of said cam and connected with said weight actuated member.

26. In a scale, a weight actuated member, pivoted members mounted on fixed axes and each comprising a hub having an arm projecting therefrom, one of said arms extending upwardly and the other extending downwardly, a link pivotally connected at its ends to the free ends of the respective arms, a chart pivotally mounted on said link, a plate adjustably secured to one of said hubs for movement about the axis thereof, a cam rigidly secured to said plate, means for controlling the relative positions of said cam and said hub, and a ribbon secured to said hub, extending about said cam and connected with said weight actuated member.

27. In a scale, a weight actuated member, pivoted members mounted on fixed axes and each comprising a hub having an arm projecting therefrom, one of said arms extending upwardly and the other extending downwardly, a link pivotally connected at its ends to the free ends of the respective arms, a chart pivotally mounted on said link, a plate mounted about the axis of one of said hubs and having a plurality of slots, screws extending through the respective slots to loosely connect said plate with the end of said hub, a cam rigidly secured to said plate, an adjustable stop carried by said hub to control the position of said cam with relation to said hub, and a ribbon secured to said hub extending about said cam and connected with said weight actuated member.

28. In a scale, a weight actuated member, pivoted members mounted on fixed axes and each comprising a hub having an arm projecting therefrom, one of said arms extending upwardly and the other extending downwardly, a link pivotally connected at its ends to the free ends of the respective arms, a chart pivotally mounted on said link, a plate mounted about the axis of one of said hubs and having a plurality of slots, screws extending through the respective slots to loosely connect said plate with the end of said hub, a cam rigidly secured to said plate, an adjustable stop carried by said hub to control the position of said cam with relation to said hub, a ribbon secured to said hub, extending about said cam and connected with said weight actuated member, and weights adjustably connected with said hub to establish the center of gravity of the hub and its associated parts with relation to the axis thereof.

29. In a scale, a weight actuated member, pivoted members having arms extending upwardly and downwardly from their respective axes, a link pivotally connected at its ends to the free ends of said arm, an elongated chart pivotally mounted on said link, means for counterbalancing said chart to establish the center of gravity thereof with relation to its axis, and an operative connection between one of said pivoted members and said weight actuated member.

30. In a scale, a weight actuated member, pivoted members mounted on fixed axes and each having an arm, said arms extending upwardly and downwardly from their respective axes, a link pivotally connected at its ends to the free ends of said arms, alined pintles extending beyond the lateral edges of said link, a yoke embracing said link and having its arms pivotally mounted on the respective pintles, a chart rigidly secured to said yoke and extending transversely to the axis thereof, weights adjustably mounted on said yoke to establish the center of gravity of said chart with relation to the axis of said yoke, and an operative connection between one of said pivoted members and said weight actuated member.

31. In a scale, a weight actuated member, pivoted members mounted on fixed axes and having arms extending upwardly and downwardly from the respective axes thereof, a link pivotally connected at its ends with the free ends of the respective arms, a chart pivotally mounted on said link, an operative connection between one of said pivoted members and said weight actuated member to control the movement of said chart, and a weight indicator comprising a stationary member and a movable member operatively connected with said link.

32. In a scale, a weight actuated member, pivoted members mounted on fixed axes and having arms extending upwardly and downwardly from the respective axes thereof, a link pivotally connected at its ends with the free ends of the respective arms, a chart pivotally mounted on said link, and operative connection between one of said pivoted members and said weight actuated member to control the movement of said chart, a stationary weight indicating chart, and an indicator arm having a part moving over said chart and operatively connected with said link.

33. In a scale, a weight actuated member, pivoted members mounted on fixed axes and having arms extending upwardly and downwardly from the respective axes thereof, a link pivotally connected at its ends with the free ends of the respective arms, a chart pivotally mounted on said link, an operative connection between one of said pivoted members and said weight actuated member to control the movement of said chart, a stationary weight indicating chart, an indicating arm pivotally mounted on said link, having one end arranged to travel over said weight chart, and having its other end extending beyond said link, and means to hold the last mentioned end of said arm against transverse movement as said link moves from one position to another.

34. In a scale, a weight actuated member, pivoted members mounted on fixed axes and having arms extending upwardly and downwardly from the respective axes thereof, a link pivotally connected at its ends with the free ends of the respective arms, a chart pivotally mounted on said link, an operative connection between one of said pivoted devices and said weight actuated member to control the movement of said chart, a stationary weight indicating chart, an indicating arm pivotally mounted on said link and having one end arranged to travel over said weight chart, and having its other end extending beyond said link, a fixed part having a vertical guideway, and a pin carried by the last mentioned end of said weight indicating arm and traveling in said guideway.

35. In a scale, a weight actuated member, a chart mounted independently of said weight actuated member and having value graduations, means controlled by said weight actuated member for actuating said chart an indicating member mounted for movement independently of said weight actuated member and cooperating with said chart, and means for positioning said indicating member whereby the significance of the graduations on said chart may be varied.

36. In a scale, a weight actuated member, a chart having value graduations, means controlled by said weight actuated member for actuating said chart, an indicating member mounted for movement independently of said weight actuated member and cooperating with said chart, and a unit receptacle mounted for movement and operatively connected with said indicating member, whereby the significance of the graduations on said chart may be varied.

37. In a scale, a weight actuated member, a chart having value graduations, means controlled by said weight actuated member for actuating said chart, an indicating member mounted for movement independently of said weight actuated member and cooperating with said chart, a unit receptacle mounted for movement, means for actuating said indicating member by the movement of said unit receptacle to vary the significance of the graduations on said chart, and a weight indicating device controlled by said weight actuated member.

38. In a scale, a weight actuated member, an elongated chart having value graduations, means controlled by said weight actuated member for moving said chart transversely to its length, a pivoted indicating member normally extending lengthwise of said chart and movable independently thereof, a unit receptacle mounted for movement, and means controlled by said unit receptacle for actuating said indicating member.

39. In a scale, a weight actuated member, an elongated chart having value graduations, means controlled by said weight actuated member for moving said chart transversely to its length, a pivoted indicating member normally extending lengthwise of said chart and movable independently thereof, an actuating member operatively connected with said indicating member, and a unit receptacle mounted for movement and operatively connected with said actuating member to control the position of said indicating member.

40. In a scale, a weight actuated member, an elongated chart having value graduations, means controlled by said weight actuated member to impart movement to said chart transversely to its length, an indicating member normally extending lengthwise of said chart, a support for said indicating member, a pivot pin rigidly secured to said support, bearings for said pivot pin, an actuating member mounted on said pivot pin and connected with said support for said indicating member, a unit receptacle mounted for movement, and an operative connection between said unit receptacle and said actuating member.

41. In a scale, a weight actuated member, an elongated chart having value graduations, means controlled by said weight actuated member to impart movement to said chart transversely to its length, an indicating member normally extending lengthwise of said chart, a support for said indicating member, a pivot pin rigidly secured to said support, bearings for said pivot pin, balancing devices connected with said support for adjusting the center of gravity thereof with relation to its axis, and means for moving said support about said axis to impart movement to said indicating member.

42. In a scale an arm, a link adapted to be connected with said arm and having an opening therethrough, said arm having a part extending through said opening, a plate secured to said arm and having a slot through which the end of said link extends, one wall of said slot having a knife edge to engage the surface of said link, and one wall of the opening in said link having a knife edge to engage the face of said rod, said link also having lateral portions provided with knife edges to engage the respective end portions of said plate, said plate having openings adjacent to the end portions thereof, and lugs secured to said link and extending through the last mentioned openings, the upper walls of said openings having knife edges to engage said lugs, the several knife edges of said plate and said link converging to a common axis.

43. In a scale a rod, a link adapted to be connected to said rod, a plate extending transversely to the end portion of said rod and rigidly secured thereto, said plate having a slot comprising an intermediate portion, and end portions arranged out of line with said intermediate portion, the outer wall of the intermediate portion of said slot having a knife edge and the inner walls of the outer portions of said slots having knife edges, said link having an intermediate portion to extend through the intermediate portion of the slot in said plate and provided with an opening to receive the adjacent portion of said rod, the outer wall of said opening in said link having a knife edge to engage said rod, said link having lateral portions spaced from said intermediate portion and provided with knife edges to engage the adjacent surface of the end portions of said plate, and fingers rigidly secured to said link and extending through the end portions of the slot in said plate, the several knife edges of said plate and said link being arranged on a common axis extending lengthwise of said plate.

44. In a scale, a weight actuated member, pivoted members mounted on fixed axes and having arms extending upwardly and downwardly from the respective axes thereof, a link connecting said arms one to the other, an indicating member carried by said link, means controlled by said weight actuated member for imparting movement to said indicating member, a second indicating member mounted adjacent to but normally out of contact with the first mentioned indicating member, means for actuating said second indicating member, and means for moving one of said indicating members substantially into contact with the other.

45. In a scale, a weight actuated member, pivoted members mounted on fixed axes and having arms extending upwardly and downwardly from the respective axes, a link connected at its ends with the free ends of the respective arms, a chart carried by said link, means controlled by said weight actuated member to impart movement to said chart, an indicating member movable independently of said chart and supported normally out of engagement therewith but in cooperative relation thereto, means for actuating said indicating member, and means for moving said indicating member substantially into contact with said chart.

46. In a scale, a weight actuated member, pivoted arms mounted on fixed axes and having arms extending upwardly and downwardly from the respective axes thereof, a link connecting said arms one to the other, an indicating member carried by said link, means controlled by said weight actuated member for imparting movement to said indicating member, a pivoted indicating member cooperating with the first mentioned indicating member and arranged normally out of contact therewith, means for actuating said second indicating member to move the same about its axis, and means acting on said second indicating member at the axis thereof for shifting the same toward the first mentioned indicating member without imparting movement thereto about its axis.

47. In a scale, a weight actuated member, pivoted arms mounted on fixed axes and having arms extending upwardly and downwardly from the respective axes thereof, a link connecting said arms one to the other, an indicating member carried by said link, means controlled by said weight actuated member for imparting movement to said indicating member, a second indicating member, a pivot pin secured to said second indicating member having knife edged portions, bearings for said knife edged portions of said pivot pin, the ends of said knife edged portions of said pivot pin being beveled to provide the pin with points at the axis thereof, means for moving said second indicating member about its axis, and means acting on the points of said pivot pin to shift said indicating member toward or from the first mentioned indicating member.

48. In a scale, a weight actuated member, pivoted arms mounted on fixed axes and having arms extending upwardly and downwardly from the respective axes thereof, a link connecting said arms one to the other, an indicating member carried by said link, means controlled by said weight actuated member for imparting movement to said indicating member, a second indicating member, a pivot pin secured to said second indicating member and having knife edged portions, bearings for said knife edged portions of said pivot pin, the ends of said knife edged portions of said pivot pin being beveled to provide the pin with points at the axis thereof, means for moving said second indicating member about its axis, actuating levers pivotally mounted between their ends and engaging the points at the respective ends of said pivot pin, means for connecting said levers one to the other, a spring acting on one of said levers to hold said pivot pin in its normal position, manually operated means acting on said levers to shift said pivot pin axially and move said second indicating member toward the first mentioned indicating member.

49. In a scale, a weight actuated member, pivoted arms mounted on fixed axes and having arms extending upwardly and downwardly from the respective axes thereof, a link connecting said arms one to the other, an indicating member carried by said link, means controlled by said weight actuated member for imparting movement to said indicating member, a second indicating member, a pivot pin secured to said second indicating member and having knife edged portions, bearings for said knife edged portions of said pivot pin, the ends of said knife edged portions of said pivot pin being beveled to provide the pin with points at the axis thereof, means for moving said second indicating member about its axis, actuating levers engaging the points at the respective ends of said pivot pins, a spring acting on said levers to retain said pivot pin in its normal position, an angular projection secured to one of said levers, and a longitudinally movable rod extending transversely to said lever and having a tapered head to engage said angular projection and move said levers about their axes, thereby shifting said pivot pin and moving said second indicating member toward the first mentioned indicating member.

50. In a scale, an indicating member, means for imparting movement thereto, a second indicating member cooperating with the first mentioned indicating member and arranged normally out of engagement therewith, a pivot pin rigidly connected with said second indicating member and having its ends shaped to provide points on the axis thereof, bearings for said pivot pin, and means acting on the points of said pin to shift said second indicating member toward and from the first mentioned indicating member.

51. In a scale, cooperating indicating members one of which has pivotal movement relatively to the other, and mechanically operated means acting on said pivoted indicating member at the axis thereof for moving said indicating member in a direction parallel with its axis toward and from the other indicating member.

52. In a scale, cooperating indicating members one of which has pivotal movement relative to the other, a pivot pin rigidly connected with said pivoted indicating member and having its end portions shaped to form points in the axis thereof, bearings for said pivot pin, and means acting on the points of said pivot pin to shift said pivoted indicating member toward and from the other indicating member.

53. In a scale, cooperating indicating members, one of said indicating members being mounted for pivotal movement relative to the other, a knife edged pivot pin rigidly connected with said pivoted indicating member and having its ends tapered to provide points at the ends of the axes thereof, bearings for said knife edge pivot pin, and means acting on the points of said pivot pin to move said pivoted indicating member toward and from the other indicating member.

54. In a scale, cooperating indicating members arranged normally out of contact one with the other, and mechanically operated means for moving one of said indicating members toward and from the plane of the other indicating member.

55. In a scale, a normally stationary indicating member, and a movable indicating member arranged to travel over said stationary indicating member and normally spaced out of contact therewith, and means for moving said normally stationary indicating member into contact with said movable indicating member.

56. In a scale, a normally stationary indicating member, movable supporting members on which said indicating member is mounted, a movable indicating member having a portion arranged to travel over said stationary indicating member and arranged normally out of contact therewith, and means for actuating said movable supporting members to move said stationary member into contact with said movable indicating member.

57. In a scale, a frame, supporting members slidably mounted in said frame, an indicating member rigidly secured to said supporting members, a second indicating member mounted for movement over the first mentioned indicating member and normally spaced away from the same, actuating members to engage the supporting members for the first mentioned indicating member and move said indicating member toward the movable indicating member, and means for simultaneously operating said actuating devices.

58. In a scale, a frame, supporting bars slidably mounted in said frame for fore and aft movement, an indicating chart rigidly mounted on said supporting bars, springs acting on said bars to hold said chart normally in its rearmost position, a movable indicating member arranged in front of and cooperating with said chart, a shaft, arms rigidly secured to said shaft and arranged to engage the rear ends of said supporting bars to move said chart toward said movable indicating member, and manually operated means for actuating said shaft.

59. In a scale, an elongated chart, means for imparting transverse movement to said chart, a pivoted indicating member cooperating with said chart, a pivot pin rigidly connected with said pivoted indicating member, means acting on said pivot pin at the axis thereof to move said pivoted indicating member toward and from said chart, a second chart, a movable indicating member traveling over said chart, said second chart being mounted for movement toward and from said movable indicating member, and means for simultaneously actuating said chart and the pivoted indicating member to move the same toward their cooperating indicating members.

60. In a scale, an elongated chart, means for imparting transverse movement to said chart, a pivoted indicating member normally extending lengthwise of said chart and spaced from the same, a pivot pin rigidly connected with said pivoted indicating member, means acting on said pivot pin at the axis thereof to move said pivoted indicating member toward said chart, an actuating rod operatively connected with said means, a second chart, means for movably supporting said second chart, a movable indicator cooperating with said second chart, means acting on the supporting means for said second chart to move the same toward and from said indicating member, an actuating rod operatively connected with said actuating means, and a single member connected with both of said actuating rods for simultaneously operating the same.

61. In a scale, a weight actuated member, a movable chart, a supporting structure for said chart operatively connected with said weight actuated member and mounted for movement relatively thereto, an indicating member cooperating with said chart, and means independent of said weight actuated member for imparting movement to said indicating member.

62. In a scale, a weight actuated member, a movable chart which is mounted independently of said weight actuated member and the movement of which is controlled by said weight actuated member, an indicating member movable into positions in which it will intersect said chart, and means independent of said weight actuated member for actuating said indicating member.

63. In a scale, a weight actuated member, a movable chart which is mounted independently of said weight actuated member and the movement of which is controlled by said weight actuated member, a pivotally supported indicating member movable into a position in which it will intersect said chart, and means independent of said weight actuated member for actuating said indicating member.

64. In a scale, a weight actuated member, a movable chart, means for controlling the movement of said chart by said weight actuated member, a movable indicating member to cooperate with said chart to indicate the result of a computation, and a unit receptacle mounted for movement and connected with said indicating member to control the position thereof relative to said chart.

65. In a scale, a weight actuated member, a movable chart, means controlled by said weight actuated member for controlling the position of said chart, a pivotally supported indicating member movable into a position in which it will intersect said chart to indicate thereon the result of a computation, and a unit receptacle mounted for movement and connected with said indicating member to control the position thereof relative to said chart.

66. In a scale, a structure having a guideway, a pivoted member having a part extending into said guideway, and means for imparting bodily movement to said pivoted member along said guideway, said pivoted member having its center of gravity established at the axis thereof.

67. In a scale, a part having a guideway, a movable member, an arm pivotally mounted on said movable member and having a part extending into said guideway, said arm having its center of gravity established at the axis thereof to eliminate frictional contact between said part of said arm and the walls of said guideway.

68. In a scale, a weight actuated member, an oscillating structure operatively connected with said weight actuated member, a chart mounted on said structure and movable therewith, and a pivoted indicating member to cooperate with said chart.

69. In a scale, a weight actuated member, a supporting member mounted independently of and operatively connected with said weight actuated member and adapted to be actuated thereby, a chart mounted on said supporting member for movement therewith, and an indicating member to cooperate with said chart.

70. In a scale, a weight actuated member, a supporting device mounted independently of said weight actuated member and operatively connected therewith for operation thereby, a chart supported by said device and movable bodily therewith, and an indicating member to cooperate with said chart.

71. In a scale, a weight actuated member, an oscillating structure operatively connected with said weight actuated member, a chart mounted on said structure and movable therewith, an indicating member to cooperate with said chart, and a unit receptacle mounted for movement and operatively connected with said indicating member.

72. In a scale, a weight actuated member, an indicating member, a movable supporting member upon which said indicating member is pivotally mounted, and means controlled by said weight actuated member to actuate said supporting member and to cause the axis of said indicating member to move in a substantially straight line.

73. In a scale, a weight actuated member, an indicating member, a movable supporting member upon which said indicating member is pivotally mounted, means controlled by said weight actuated member to actuate said supporting member and to cause the axis of said indicating member to move in a substantially straight line, and means for controlling the radial position of said indicating member about its axis.

74. In a scale, a weight actuated member, an indicating member, a movable supporting member upon which said indicating member is pivotally mounted, means controlled by said weight actuated member to actuate said supporting member and to cause the axis of said indicating member to move in a substantially straight line, means for controlling the radial position of said indicating member, and means for adjusting the center of gravity of said indicating member with relation to the axis thereof.

75. In a scale, a weight actuated member, an indicating member, a movable supporting member upon which said indicating member is pivotally mounted, and means controlled by said weight actuated member to actuate said supporting member and to cause the axis of said indicating member to move in a substantially straight line, and a second indicating member to cooperate with the first mentioned indicating member.

76. In a scale, a weight actuated member, an indicating member, a movable supporting member upon which said indicating member is pivotally mounted, means controlled by said weight actuated member to actuate said supporting member and to cause the axis of said indicating member to move in a substantially straight line, means for controlling the radial position of said indicating member about its axis, and a second indicating member to cooperate with the first mentioned indicating member.

77. In a scale, a weight actuated member, an indicating member, a movable supporting member upon which said indicating member is pivotally mounted, means controlled by said weight actuated member to actuate said supporting member and to cause the axis of said indicating member to move in a substantially straight line, means for controlling the radial position of said indicating member about its axis, means for adjusting the center of gravity of said indicating member with relation to the axis thereof, and a second indicating member to cooperate with the first mentioned indicating member.

78. In a scale, a weight actuated member, an indicating member, a movable supporting member upon which said indicating member is pivotally mounted, means controlled by said weight actuated member to actuate said supporting member and to cause the axis of said indicating member to move in a substantially straight line, a second indicating member to cooperate with the first mentioned indicating member, and means to position said second indicating member according to a unit of computation.

79. In a scale, a weight actuated member, an indicating member, a movable supporting member upon which said indicating member is pivotally mounted, means controlled by said weight actuated member to actuate said supporting member to cause the axis of said indicating member to move in a substantially straight line, means for controlling the radial position of said indicating member about its axis, a second indicating member to cooperate with the first mentioned indicating member, and means to position said second indicating member according to a unit of computation.

80. In a scale, a weight actuated member, an indicating member, a movable supporting member upon which said indicating member is pivotally mounted, means controlled by said weight actuated member to actuate said supporting member and to cause the axis of said indicating member to move in a substantially straight line, means for controlling the radial position of said indicating member about its axis, means for adjusting the center of gravity of said indicating member with relation to the axis thereof, a second indicating member to cooperate with the first mentioned indicating member, and means to position said second indicating member according to a unit of computation.

81. In a scale, a weight actuated member, a supporting member operatively connected with said weight actuated member and adapted to be moved bodily thereby, a chart pivotally mounted on said supporting member for movement therewith, and an indicating member to cooperate with said chart.

82. In a scale, a weight actuated member, a supporting device operatively connected with said weight actuated member and actuated thereby, a chart pivotally supported by said device and movable therewith, and an indicating member to cooperate with said chart.

83. In a scale, a supporting structure mounted for bodily movement, an indicating member pivotally mounted on said structure, means comprising a guideway to control the pivotal action of said member, and means for actuating said structure.

84. In a scale, a movable supporting member, an indicating member pivotally mounted on said supporting member, and means to control the pivotal action of said indicating member, said indicating member being so arranged as to prevent it from exerting pressure upon said controlling means.

In testimony whereof, I affix my signature hereto.

WILLIAM R. MITTENDORF.